US012374259B2

(12) United States Patent
Lyu

(10) Patent No.: US 12,374,259 B2
(45) Date of Patent: Jul. 29, 2025

(54) METHOD FOR DRIVING DISPLAY OF DISPLAY PANEL, DISPLAY DRIVER CHIP AND DISPLAY DEVICE

(71) Applicants: WUHAN TIANMA MICROELECTRONICS CO., LTD., Wuhan (CN); WUHAN TIANMA MICROELECTRONICS CO., LTD. SHANGHAI BRANCH, Shanghai (CN)

(72) Inventor: Bojia Lyu, Shanghai (CN)

(73) Assignees: WUHAN TIANMA MICROELECTRONICS CO., LTD., Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 0 days.

(21) Appl. No.: 18/475,272

(22) Filed: Sep. 27, 2023

(65) Prior Publication Data

US 2024/0021135 A1 Jan. 18, 2024

(30) Foreign Application Priority Data

Apr. 25, 2023 (CN) ......................... 202310493170.7

(51) Int. Cl.
*G09G 3/20* (2006.01)

(52) U.S. Cl.
CPC ... *G09G 3/2074* (2013.01); *G09G 2320/0276* (2013.01); *G09G 2320/0626* (2013.01); *G09G 2320/0673* (2013.01)

(58) Field of Classification Search
CPC .. G09G 3/36; G09G 3/34; G09G 3/20; G09G 3/32; G09G 3/2074; G09G 2320/0276; G09G 2320/0626; G09G 2320/0673
See application file for complete search history.

(56) References Cited

U.S. PATENT DOCUMENTS

2023/0143803 A1* 5/2023 Lee ...................... G09G 3/2011 345/690
2023/0245629 A1* 8/2023 Ko ....................... G09G 3/2011 345/690

* cited by examiner

*Primary Examiner* — Michael A Faragalla
(74) *Attorney, Agent, or Firm* — KILPATRICK TOWNSEND & STOCKTON LLP

(57) ABSTRACT

A method for driving display of a display panel, a display driver chip and a display device are provided. The method includes: acquiring a to-be-displayed grayscale of a sub-pixel in a frame of a to-be-displayed image; determining whether the to-be-displayed grayscale meets a grayscale optimization condition of a gamma curve; on determining that the to-be-displayed grayscale meets the grayscale optimization condition of the gamma curve, dividing a refresh period of the to-be-displayed image into sub-frames; and in the refresh period of the to-be-displayed image, controlling the sub-pixel to display first grayscales based on first data signals; and the first grayscales are not equal to the to-be-displayed grayscale, the first grayscales and the first data signals corresponding to the first grayscales satisfy the gamma curve.

16 Claims, 11 Drawing Sheets

METHOD FOR DRIVING DISPLAY OF DISPLAY PANEL, DISPLAY DRIVER CHIP AND DISPLAY DEVICE

This application claims priority to Chinese Patent Application No. 202310493170.7, titled "METHOD FOR DRIVING DISPLAY OF DISPLAY PANEL, DISPLAY DRIVER CHIP AND DISPLAY DEVICE", filed on Apr. 25, 2023 with the China National Intellectual Property Administration, which is hereby incorporated by reference in its entirety.

FIELD

The present disclosure relates to the field of image display technology, and more particularly, to a method for driving display of a display panel, a display driver chip and a display device.

BACKGROUND

A growing quantity of display devices are widely applied in the daily life and work, as the constant advancement of science and technology, which makes the daily life and work more convenient. Hence, the display devices have become essential and significant tools in the current life of individuals.

A display panel, functioning as displaying, is an essential component of a display device. The display panel is required to display images based on a display driver chip. In related display device, when the display driver chip controls the display panel to display images, it cannot accurately display the brightness of the grayscales that are to be displayed, which compromises the display quality.

SUMMARY

In view of this, a method for driving display of a display panel, a display driver chip and a display device are provided according to the present disclosure, the solutions are as follows.

A method for driving display of a display panel, including:

acquiring a to-be-displayed grayscale of a sub-pixel in a frame of a to-be-displayed image;

determining whether the to-be-displayed grayscale meets a grayscale optimization condition of a gamma curve;

on determining that the to-be-displayed grayscale meets the grayscale optimization condition of the gamma curve, dividing a refresh period of the to-be-displayed image into sub-frames; and in the refresh period of the to-be-displayed image, controlling the sub-pixel to display first grayscales based on first data signals; and the first grayscale corresponding to at least a first part of the sub-frames is greater than the to-be-displayed grayscale, the first grayscale corresponding to at least a second part of the sub-frames is less than the to-be-displayed grayscale, and the first grayscales are not equal to the to-be-displayed grayscale, the first grayscales and the first data signals corresponding to the first grayscales satisfy the gamma curve.

A display driver chip, including:

an acquisition circuit, configured to acquire a to-be-displayed grayscale of a sub-pixel in a frame of a to-be-displayed image;

a processor, configured to determine whether the to-be-displayed grayscale meets a grayscale optimization condition of a gamma curve; and divide a refresh period of the to-be-displayed image into sub-frames on determining that the to-be-displayed grayscale meets the grayscale optimization condition of the gamma curve; and a driving circuit, configured to control the sub-pixel to display first grayscales based on first data signals, in the refresh period of the to-be-displayed image; and the first grayscale corresponding to at least a first part of the sub-frames is greater than the to-be-displayed grayscale, the first grayscale corresponding to at least a second part of the sub-frames is less than the to-be-displayed grayscale, and the first grayscales are not equal to the to-be-displayed grayscale;

where, the first grayscales and the first data signals corresponding to the first grayscales satisfy the gamma curve.

A display device, including a display driver chip, and the display driver chip includes:

an acquisition circuit, configured to acquire a to-be-displayed grayscale of a sub-pixel in a frame of a to-be-displayed image;

a processor, configured to determine whether the to-be-displayed grayscale meets a grayscale optimization condition of a gamma curve; and divide a refresh period of the to-be-displayed image into sub-frames on determining that the to-be-displayed grayscale meets the grayscale optimization condition of the gamma curve; and a driving circuit, configured to control the sub-pixel to display first grayscales based on first data signals, in the refresh period of the to-be-displayed image; and the first grayscale corresponding to at least a first part of the sub-frames is greater than the to-be-displayed grayscale, the first grayscale corresponding to at least a second part of the sub-frames is less than the to-be-displayed grayscale, and the first grayscales are not equal to the to-be-displayed grayscale; and the first grayscales and the first data signals corresponding to the first grayscales satisfy the gamma curve.

BRIEF DESCRIPTION OF THE DRAWINGS

In order to more clearly illustrate the embodiments of the present disclosure, the drawings used in the description of the embodiments are briefly introduced hereinafter. It is apparent that the drawings in the following description illustrate only embodiments of the present disclosure.

The structures, proportions, sizes and the like shown in the drawings of this specification are only used to cooperate with the content disclosed in the specification, for those who are familiar with this technology to understand and read, which are not used to limit the conditions that can be implemented in the present disclosure, without any technical substantive significance. Any modification of the structure, change of the proportional relationship or adjustment of the size shall still fall within the scope covered by the technology content disclosed in the present disclosure without affecting the effect and purpose of the present disclosure.

DETAILED DESCRIPTION OF EMBODIMENTS

Hereinafter, embodiments of the present disclosure are described clearly and thoroughly with reference to the accompanying drawings in the implementations of the present disclosure. It is apparent that the described embodiments are merely a part of the embodiments of the present disclosure rather than all of them.

Various modifications and changes can be made in the present disclosure without departing from the spirit or scope of the present disclosure. Hence, it is intended to cover the modifications and changes of the present disclosure falling within the scope of the corresponding claims (embodiments to be protected) and their equivalents in the present disclosure. It should be noted that, the implementations provided in the embodiments of the present disclosure may be combined with each other if there is no contradiction.

The pulse width modulation (PWM) driving mode is a commonly used display driving method in the Micro LED field, which can effectively improve the LED luminous efficiency and reduce the power consumption level of the product in low grayscales. Nevertheless, when it comes to performing a gamma correction in the PWM driving mode, there is a grayscale distortion problem, i.e., the brightness of the grayscales fail to display accurately, resulting in the brightness of adjacent grayscales are indistinguishable, which compromises the display quality.

When the non-PWM driving mode controls sub-pixels for image display, the refresh period of one frame display screen is directly divided into multiple sub-frames, where each sub-frame is controlled in sequence for image display. The grayscale is related to the driving current, for example, the higher the grayscale is, the greater the driving current gets. The durations of the light-emitting phases for different display grayscales are the same. In the PWM driving mode, the driving current is a PWM signal. In the PWM driving mode, the sub-frames displaying in different grayscales have the same driving current amplitude in the light-emitting phase, while the durations of the light-emitting phases are different. Based on a combining display effect of multiple sub-frames, the brightness of the grayscale required for one refresh period is displayed.

Figure 1:
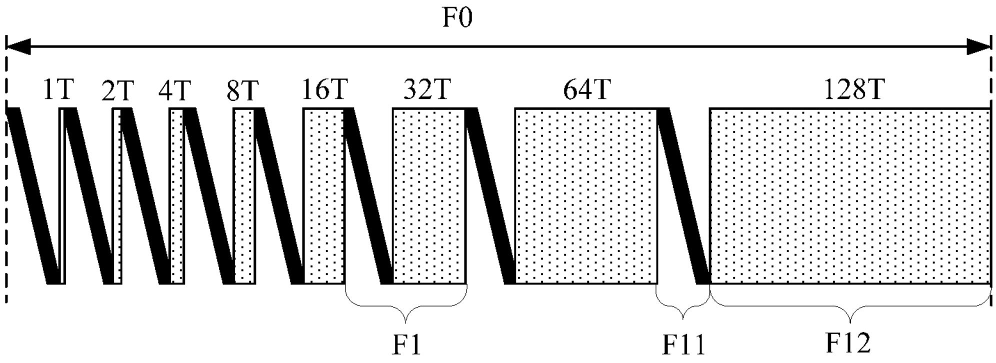
FIG. 1 is a schematic diagram of a principle of a conventional PWM drive mode.

Referring to FIG. 1, FIG. 1 is a schematic diagram of a principle of a conventional PWM driving mode. In FIG. 1, one frame F0 is divided into eight sub-frames F1. Each sub-frame F1 includes a data writing phase F11 and a light-emitting phase F12. The duration of the data writing phase F11 for each sub-frame F1 is the same, and the durations of the light-emitting phases F12 for the sub-frames F1 are different. The eight sub-frames are set to be a first sub-frame to an eighth sub-frame in timing sequence, and the duration of the light-emitting phase F12 of the i-th sub-frame is $2^{i-1}$T, where i is a positive integer and no greater than 8, and T is set to be a constant. The durations of the light-emitting phase F12 of the first sub-frame to the eighth sub-frame are 1T/2T/4T/8T/16T/32T/64T/128T respectively.

The grayscale displayed in one frame is positively correlated with the total duration of the lighting-emitting phases. It only needs to control the light-emitting states of the first sub-frame to the eighth sub-frame to realize the display of any grayscale from 0 to 255. For example, in a case that all sub-frames are light-emitted, the total duration of the light-emitting phases of one frame is 255T, which can represent the grayscale with a value of 255. In a case that all sub-frames are not light-emitted, and the total duration of the light-emitting phases of one frame is 0T, which can represent the grayscale with a value of 0. In a case that only the first sub-frame and the third sub-frame are light-emitted, and the total duration of the light-emitting phase of one frame is 5T, which can represent the grayscale with a value of 5.

Figure 2:
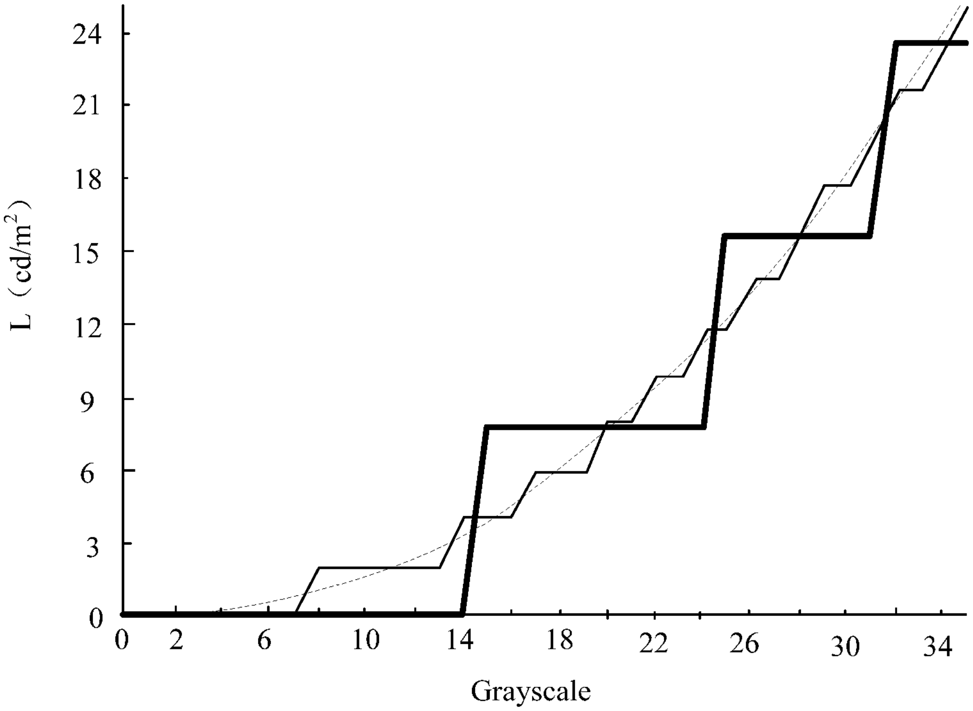
FIG. 2 is a schematic diagram of a principle that the brightness required for the grayscales cannot be accurately displayed under the conventional PWM drive mode.

Referring to FIG. 2, FIG. 2 is a schematic diagram of a principle that the brightness required for the grayscales cannot be accurately displayed under the conventional PWM drive mode. In FIG. 2, the horizontal axis is the grayscale, the vertical axis is the brightness, and the dashed curve is the gamma curve of the display panel. The relationships between the display grayscale and the brightness are shown in solid and broken lines in FIG. 2, where the thick broken line corresponds to the relationship between the actual display grayscale and the brightness when a refresh period is divided into eight sub-frames; and the thin broken line corresponds to the relationship between the actual display grayscale and brightness when a refresh period is divided into ten sub-frames.

Due to the PWM driving mode, the brightness and the display time of the light-emitting phase are a linear relationship in equal proportion, while the gamma curve is non-linear, and the display grayscale and the display brightness cannot accurately correspond to the coordinate information on the gamma curve, which in turn leads to fail to drive the display panel to display according to the gamma curve accurately, resulting in deviation in display brightness.

Comparing the thin broken line and the thick broken line in FIG. 2, this shows that the density of broken line segments of the actual display grayscale and brightness can be increased by increasing the quantity of sub-frames in the refresh period, and the broken line is further approached to the gamma curve. When driving the display, the display panel may be well driven for display based on the gamma curve to solve the problem of display brightness deviation. Nevertheless, if there are too many sub-frames in one refresh period, it cannot guarantee sufficient charging time for each sub-frame, which undermines the display brightness.

In view of this, a method for driving display of a display panel, a display driver chip and a display device are provided according to the embodiments of the present disclosure. In the embodiments of the present disclosure, when the to-be-displayed grayscale meets the grayscale optimization condition of the gamma curve, the refresh period of the to-be-displayed image is divided into multiple sub-frames, the sub-pixel is controlled to display image in sub-frames in the refresh period of the to-be-displayed image, based on the first grayscales satisfied the gamma curve and the corresponding first data signals, which can accurately display the brightness of the to-be-displayed grayscale to improve the display quality.

In order to clarify the embodiments of the present disclosure more, hereinafter an illustration of the present disclosure can be further described in detail in conjunction with the drawings and specific implementations.

Figure 3:
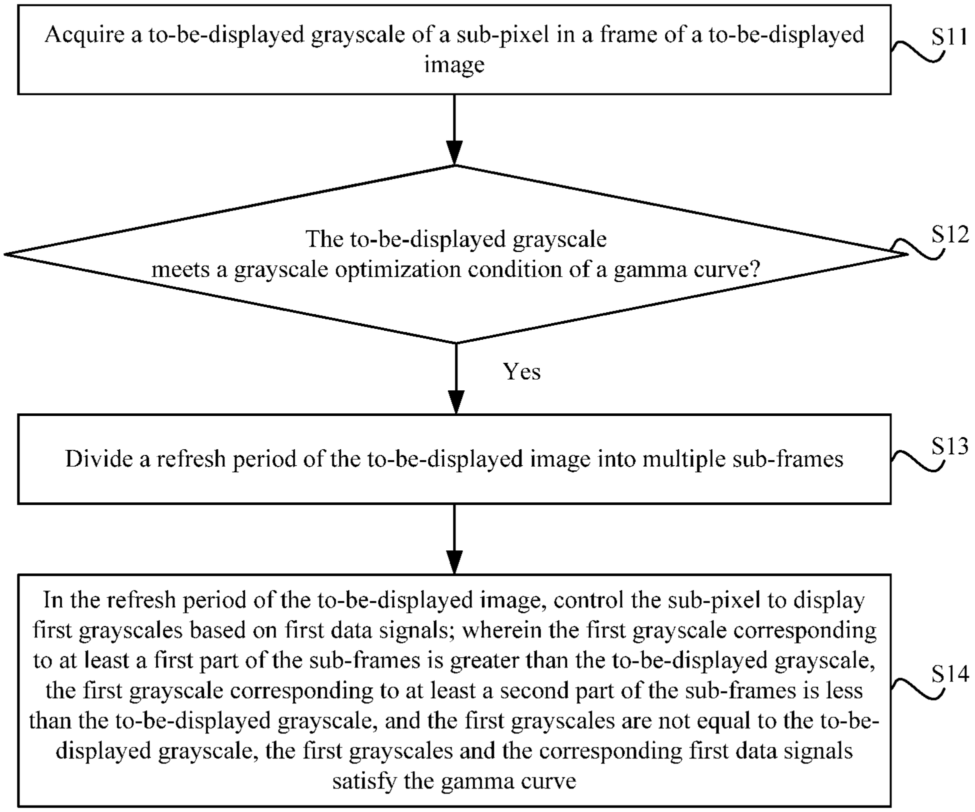
FIG. 3 is a schematic flowchart of a method for driving display according to an embodiment of the present disclosure.

Referring to FIG. 3, FIG. 3 is a schematic flowchart of a method for driving display according to an embodiment of the present disclosure. The method includes steps S11 to S14 as follows.

In step S11, a to-be-displayed grayscale of a sub-pixel in a frame of a to-be-displayed image is acquired.

In step S12, whether the to-be-displayed grayscale meets a grayscale optimization condition of a gamma curve is determined.

In step S13, on determining that the to-be-displayed grayscale meets a grayscale optimization condition of a gamma curve, a refresh period of the to-be-displayed image is divided into multiple sub-frames.

In step S14, in the refresh period of the to-be-displayed image, the sub-pixel is controlled to display first grayscales based on first data signals; where, the first grayscale corresponding to at least a first part of the sub-frames is greater than the to-be-displayed grayscale, the first grayscale corresponding to at least a second part of the sub-frames is less than the to-be-displayed grayscale, and the first grayscales are not equal to the to-be-displayed grayscale, the first grayscales and the first data signals corresponding to the first grayscales satisfy the gamma curve.

When the to-be-displayed grayscale meets the grayscale optimization condition of the gamma curve, one refresh period is divided into multiple sub-frames, and each sub-frame is controlled to display respectively. In this embodiment, the first grayscale and the corresponding first data signal displayed in a sub-frame satisfy the gamma curve, and the to-be-displayed grayscale that does not satisfy the gamma curve is equivalently displayed in multiple sub-frames through the first grayscales and the corresponding first data signals that satisfy the gamma curve, which can accurately display the brightness of the to-be-displayed grayscale.

Figure 4:
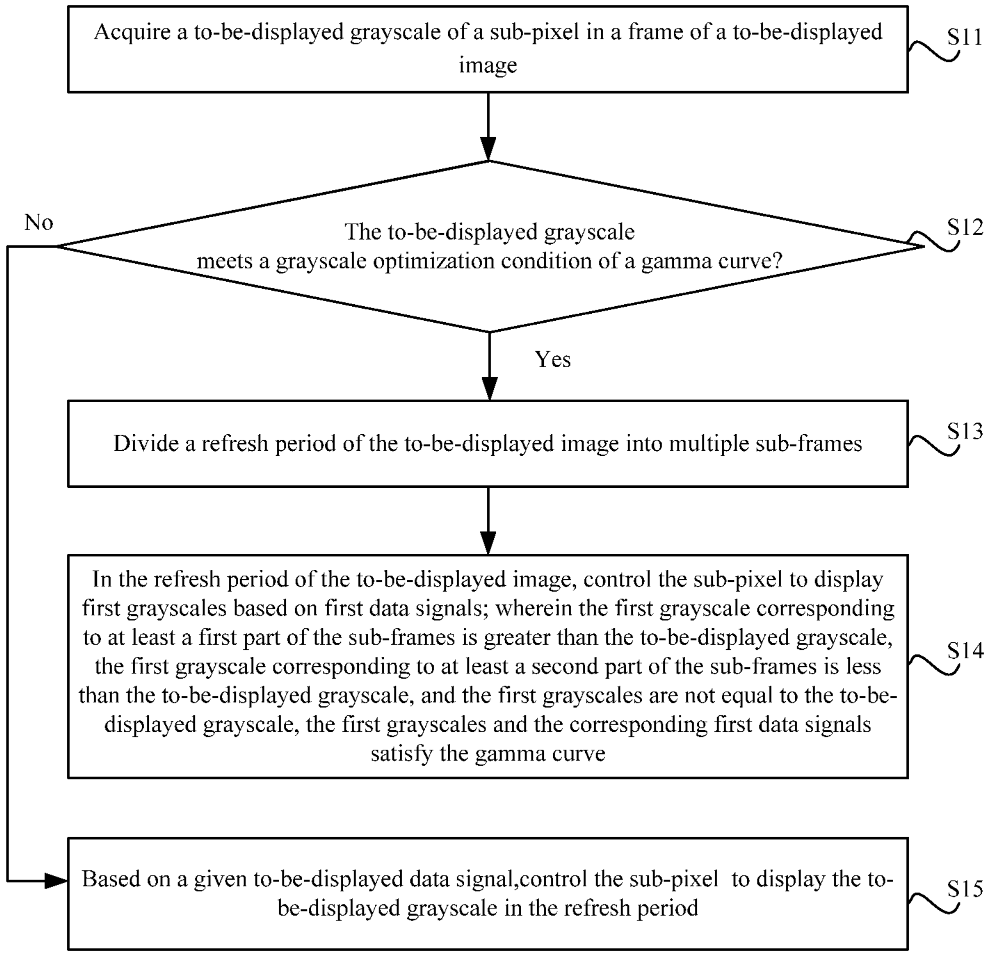
FIG. 4 is a schematic flowchart of a method for driving display according to another embodiment of the present disclosure.

Referring to FIG. 4, FIG. 4 is a schematic flowchart of a method for driving display according to another embodiment of the present disclosure. On the basis of the method shown in FIG. 3, the method for driving display shown in FIG. 4 further includes step S15.

In step S15, in a case that the to-be-displayed grayscale does not meet the grayscale optimization condition of the gamma curve, based on a given to-be-displayed data signal, the sub-pixel is controlled to display the to-be-displayed grayscale in the refresh period.

When the grayscale optimization condition of the gamma curve is not met, the brightness required for the to-be-displayed grayscale can display accurately by only controlling the sub-pixel to display once, based on the to-be-displayed data signal, in the refresh period, without dividing into multiple sub-frames for multiple times display control.

In the above step S12, the method of determining whether the to-be-displayed grayscale meets the grayscale optimization condition includes: in a case that the to-be-displayed grayscale and a to-be-displayed data signal corresponding to the to-be-displayed grayscale do not satisfy the gamma curve, it is determined that the grayscale optimization condition is met; and in a case that the to-be-displayed grayscale and the to-be-displayed data signal corresponding to the to-be-displayed grayscale satisfy the gamma curve, it is determined that the grayscale optimization condition is not met.

Figure 5:
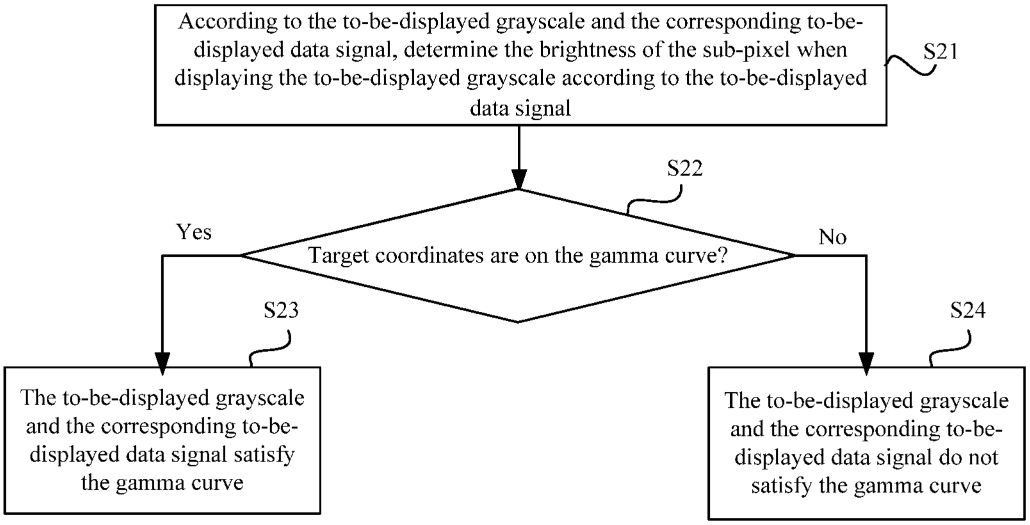
FIG. 5 is a flowchart of a process for determining whether the to-be-displayed grayscale and the corresponding to-be-displayed data signal satisfy a gamma curve according to an embodiment of the present disclosure.

Referring to FIG. 5, FIG. 5 is a flowchart of a process for determining whether the to-be-displayed grayscale and the corresponding to-be-displayed data signal satisfy a gamma curve according to an embodiment of the present disclosure. The method includes steps S21 to S24 as follows.

In step S21, according to the to-be-displayed grayscale and the corresponding to-be-displayed data signal, the brightness of the sub-pixel when displaying the to-be-displayed grayscale according to the to-be-displayed data signal is determined.

For a given display panel, its gamma curve is determined, and the brightness when displaying the corresponding to-be-displayed grayscale based on the to-be-displayed data signal is also determined. The display panel can be tested for the light-emitting brightness in advance to obtain the brightness of the sub-pixel when displaying the to-be-displayed grayscale under the to-be-displayed data signal.

In step S22, whether target coordinates are on the gamma curve is determined.

Where, the horizontal coordinate of the target coordinates is the to-be-displayed grayscale, and the vertical coordinate of the target coordinates is the brightness of the sub-pixel when displaying based on the to-be-displayed grayscale.

In step S23, on determining that the target coordinates are on the gamma curve, it is determined that the to-be-displayed grayscale and the corresponding to-be-displayed data signal satisfy the gamma curve.

In step S24, on determining that the target coordinates are not on the gamma curve, it is determined that the to-be-displayed grayscale and the corresponding to-be-displayed data signal do not satisfy the gamma curve.

When determining whether the to-be-displayed grayscale and the corresponding to-be-displayed data signal satisfy the gamma curve, it is only necessary to determine whether the target coordinates are located on the gamma curve. In other words, whether the relationship corresponding to the gamma curve is satisfied. In a case that the relationship is not satisfied, then it is determined that the grayscale optimization condition is met, the to-be-displayed image is required to display in multiple sub-frames based on the solution of the present disclosure. Otherwise, it is determined that the grayscale optimization condition is not met, the sub-pixel is directly controlled to display the to-be-displayed grayscale based on the to-be-displayed data signal without the need of multiple sub-frames.

In an embodiment, in the refresh period of the to-be-displayed image, controlling the sub-pixel to display the first grayscale based on the first data signal includes: based on the quantity of sub-frames divided in the refresh period, the first grayscales of the sub-pixel in different sub-frames and the first data signals corresponding to the first grayscales are determined. The first grayscales and the first data signals corresponding to the sub-frames are related to the quantity of sub-frames divided in the refresh period. For the divided sub-frames of different quantity, multiple sets of first grayscales and their corresponding first data signals are pre-stored, to read the first grayscales corresponding to sub-frames and the corresponding first data signals when the grayscale optimization conditions are satisfied, and the accurate brightness of the to-be-displayed grayscale is equivalently displayed in multiple sub-frames manner.

Figure 6:
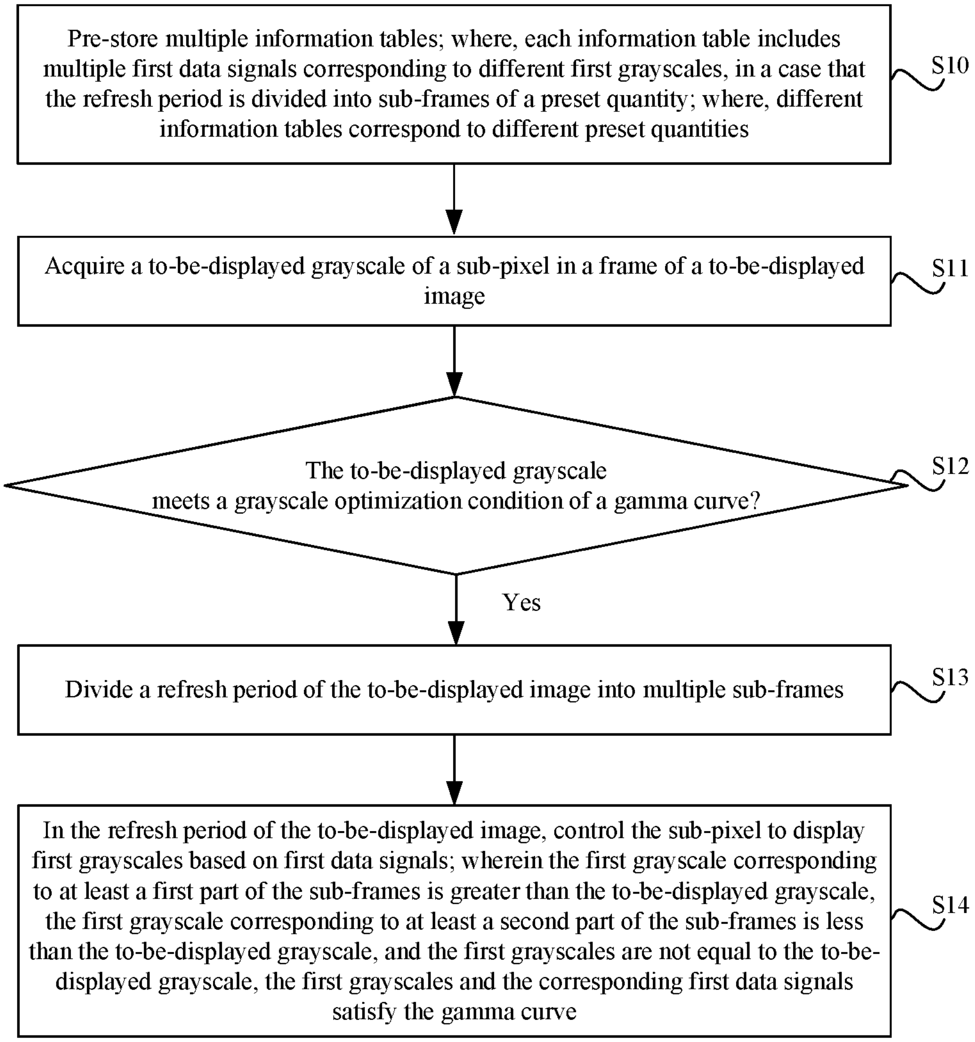
FIG. 6 is a schematic flowchart of a method for driving display according to still another embodiment of the present disclosure.

Referring to FIG. 6, FIG. 6 is a schematic flowchart of a method for driving display according to still another embodiment of the present disclosure. On the basis of the method for driving display shown in FIG. 3, the method shown in FIG. 6 further includes step S10.

In step S10, multiple information tables are pre-stored, each information table includes multiple first data signals corresponding to different first grayscales, in a case that the refresh period is divided into sub-frames of a preset quantity, where different information tables correspond to different preset quantities.

When multiple information tables are pre-stored, the divided sub-frames of different preset quantities correspond to different information tables. After determining how many sub-frames are divided in the refresh period, i.e. the quantity of the divided sub-frames, the first grayscale and the first data signal required for each sub-frame may be obtained by querying the corresponding information table, to equivalently display the accurate brightness of the to-be-displayed grayscale by displaying the corresponding first grayscales through multiple sub-frames respectively.

Referring to FIG. 6, information tables, which divide the refresh period into different preset quantities, are pre-stored. Where, each information table includes multiple first data signals corresponding to different first grayscales for the corresponding preset quantity. In this way, when the above method for driving display is implemented, based on the selected quantity of sub-frames divided by the refresh period, the first grayscale and the corresponding first data signal, which are used by each sub-frame when control the sub-pixel for display, may be selected from the corresponding information table.

By performing brightness information detection on the display panel, the first data signals are acquired, where the first data signals corresponding to different first grayscales that are displayed when the display panel displays in multiple sub-frames according to the preset quantities of sub-frames. When the display panel is in the manufacturer, the brightness information detection is required to acquire the gamma curve. In the brightness information detection process required for acquiring the gamma curve, based on the brightness detection data, the above first data signals, i.e., the first data signals corresponding to different first grayscales that are displayed when the display panel displays in multiple sub-frames according to sub-frames of preset quantities, can be acquired synchronously. In this way, there is no need to implement the brightness information detection process separately.

When multiple information tables are pre-stored, dividing the refresh period of the to-be-displayed image into multiple sub-frames in the above step S13 includes: determining the quantity of sub-frames divided in the refresh period, based on inputted input information indicating the quantity of sub-frames. In this manner, based on the input information, the refresh period can be divided into sub-frames of different quantities, which make the process of dividing the refresh period into multiple sub-frames have diversity. The preset quantities corresponding to different information tables may be set as required, for example, it may be two or four, which is not limited in this embodiment of the present disclosure. In a case that multiple information tables are pre-stored, the method for driving display can be as shown in FIG. 7.

Figure 7:
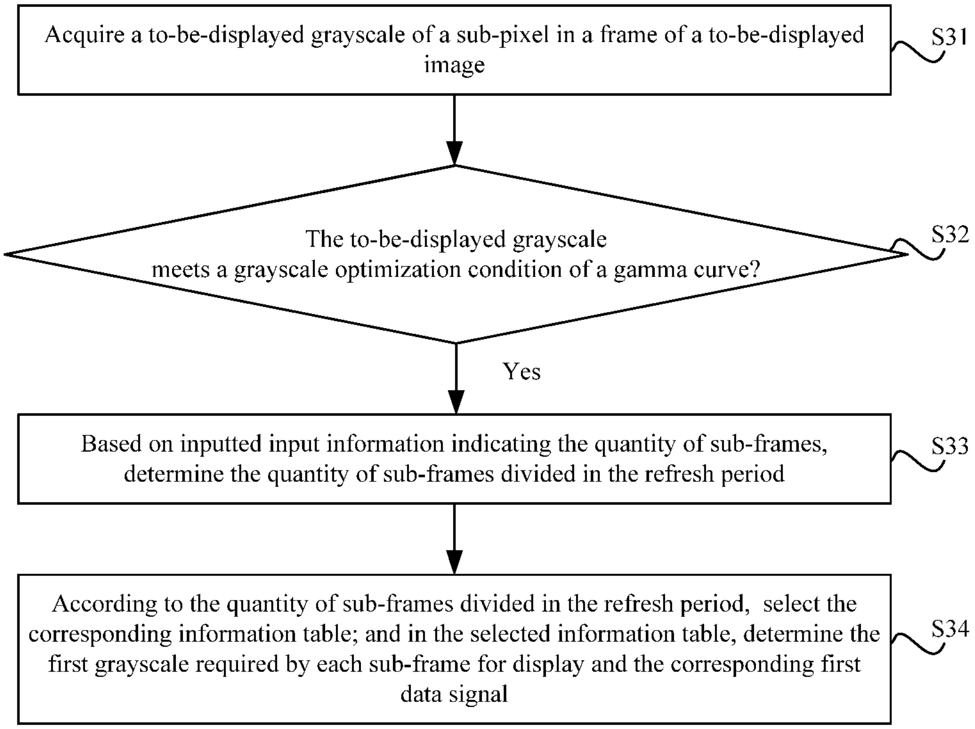
FIG. 7 is a schematic flowchart of a method for driving display according to still another embodiment of the present disclosure.

Referring to FIG. 7, FIG. 7 is a schematic flowchart of a method for driving display according to still another embodiment of the present disclosure, and the method for driving display includes steps S31 to S34 as follows.

In step S31, a to-be-displayed grayscale of a sub-pixel in a frame of a to-be-displayed image is acquired.

In step S32, whether the to-be-displayed grayscale meets a grayscale optimization condition of a gamma curve is determined.

In step S33, on determining that the to-be-displayed grayscale meets the grayscale optimization condition of the gamma curve, based on inputted input information indicating the quantity of sub-frames, the quantity of sub-frames divided in the refresh period is determined.

In step S34, according to the quantity of sub-frames divided in the refresh period, the corresponding information table is selected; and in the selected information table, the first grayscale required by each sub-frame for display and the corresponding first data signal are determined.

In the method for driving display shown in FIG. 7, the process of step S31 to step S32 is the same as the process of step S11 to step S12 in the above embodiment, which differs from the above embodiment is that, the method as shown in FIG. 7 includes: the process of dividing the refresh period of the to-be-displayed image into multiple sub-frames in a case that the grayscale optimization condition of the gamma curve is met, which is shown in step S33. In this way, as described above, based on the input information, the refresh period can be divided into sub-frames of different quantities, which make the process of dividing the refresh period into multiple sub-frames have diversity.

In the manner shown in FIG. 7, the difference from the above embodiments further includes: the process of controlling the sub-pixel to display the first grayscales in the refresh period of the to-be-displayed image based on the first data signals, which is shown in step S34. In this way, the quantity of sub-frames currently divided in the refresh period is used as the target preset quantity, and the corresponding information table can be determined. In this information table, the first grayscale required by each sub-frame for display and the corresponding first data signal can be selected.

In other implementations, the method for driving display can further pre-store one information table, and the information table corresponds to multiple first data signals corresponding to different first grayscales in a case that the refresh period is divided into sub-frames of first quantity.

When only one information table is pre-stored, when the grayscale optimization condition of the gamma curve is met, the refresh period is divided into sub-frames of first quantity directly based on a fixed mode for dividing into sub-frames, i.e., the mode for dividing the refresh period into the sub-frames is simple and unique. Once the grayscale optimization condition of the gamma curve is met, it can automatically divide the refresh period into sub-frames of the fixed quantity, without manual operation by a user. In this case, the display panel may also be subjected to brightness information detection to acquire the first data signals corresponding to different first grayscales displayed when the display panel displays in multiple sub-frames according to the sub-frames of first quantity.

When one information table is pre-stored, in the method for driving display, dividing the refresh period of the to-be-displayed image into multiple sub-frames includes: dividing the refresh period into sub-frames of a first quantity. In this case, as described above, when the grayscale optimization condition of the gamma curve is met, it can automatically divide the refresh period into sub-frames of the fixed quantity. The first quantity may be set as required, for example, it may be two or four, which is not limited in this embodiment of the present disclosure. When one information table is pre-stored, the method for driving display may be as shown in FIG. 8.

Figure 8:
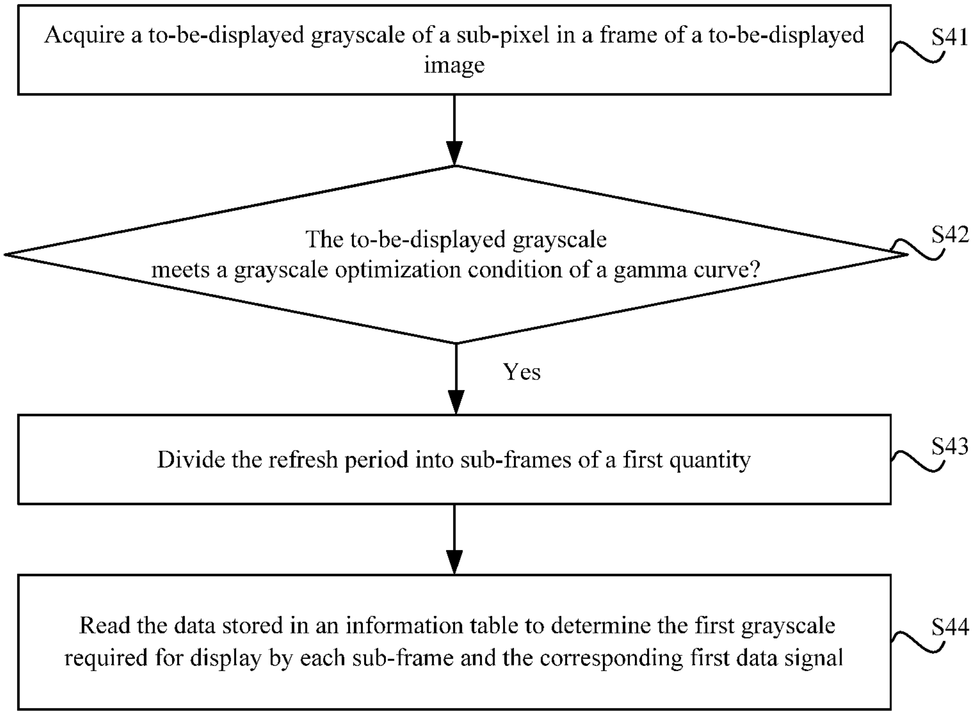
FIG. 8 is a schematic flowchart of a method for driving display according to still another embodiment of the present disclosure.

Referring to FIG. 8, FIG. 8 is a schematic flowchart of a method for driving display according to still another embodiment of the present disclosure. On the basis of the method for driving display shown in FIG. 3, the method for driving display shown in FIG. 8 further includes steps S41 to S44 as follows.

In step S41, a to-be-displayed grayscale of a sub-pixel in a frame of a to-be-displayed image is acquired.

In step S42, whether the to-be-displayed grayscale meets a grayscale optimization condition of a gamma curve is determined.

In step S43, on determining that the to-be-displayed grayscale meets the grayscale optimization condition of the gamma curve, the refresh period is divided into sub-frames of a first quantity.

In step S44, the data stored in an information table is read to determine the first grayscale required for display by each sub-frame and the corresponding first data signal.

In the method for driving display shown in FIG. 8, the process of step S41 to step S42 is the same as the process of step S11 to step S12 in the above embodiment, which differs from the above embodiment is that, the method as shown in FIG. 8 includes: the process of dividing the refresh period of the to-be-displayed image into multiple sub-frames in a case that the grayscale optimization condition of the gamma curve is met, which is shown in step S43. In this way, as described above, it can automatically divide the refresh period into sub-frames of the fixed quantity.

In the manner shown in FIG. 8, the difference from the above embodiments further includes: the process of controlling the sub-pixel to display the first grayscales in the refresh period of the to-be-displayed image based on the first data signals, which is shown in step S44. In this way, the refresh period can be directly and automatically divided into sub-frames of a fixed first quantity, and then the first grayscale required by each sub-frame for display and the corresponding first data signal can be directly selected in the information table.

Figure 9:
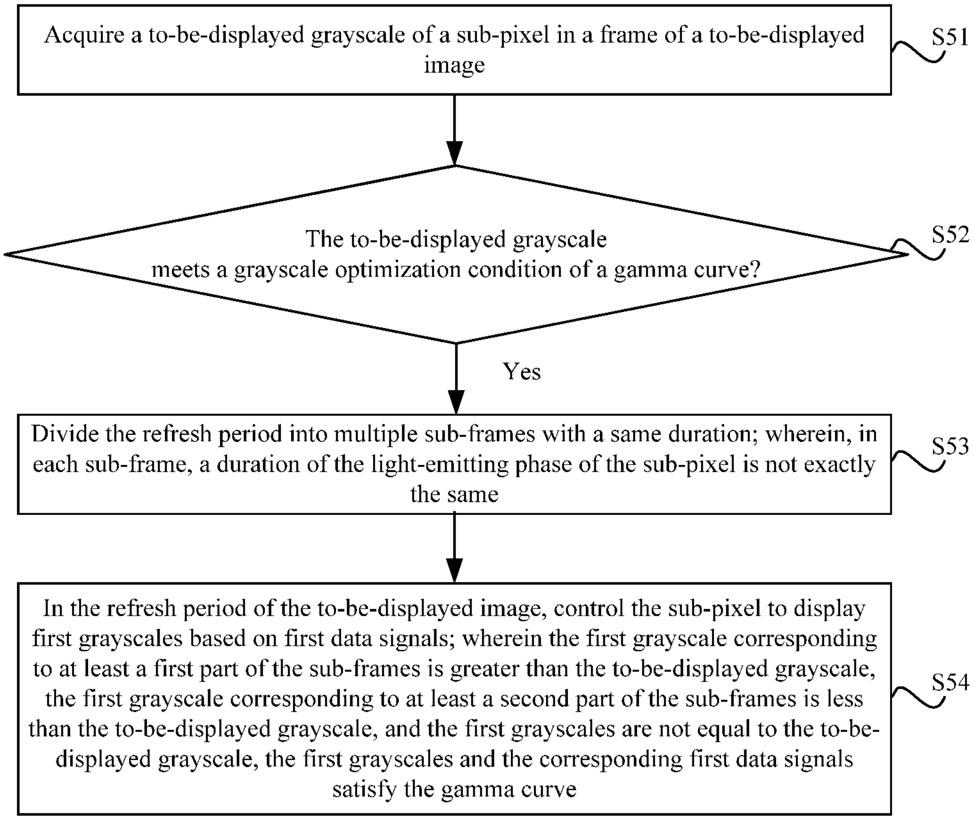
FIG. 9 is a schematic flowchart of a method for driving display according to still another embodiment of the present disclosure.

In the above embodiments, the method for dividing the refresh period of the to-be-displayed image into multiple sub-frames may be shown in step S53 in FIG. 9, which includes: dividing the refresh period into multiple sub-frames with a same duration. In each of the multiple sub-frames, the duration of the light-emitting phase of the sub-pixel is not exactly the same, and the PWM driving mode of grayscale display based on the duration of the light-emitting phase can be realized.

Referring to FIG. 9, FIG. 9 is a schematic flowchart of a method for driving display according to still another embodiment of the present disclosure. On the basis of the method for driving display in the above embodiment, the method for driving display shown in FIG. 9 includes steps S51 to S54 as follows.

In step S51, a to-be-displayed grayscale of a sub-pixel in a frame of a to-be-displayed image is acquired.

In step S52, whether the to-be-displayed grayscale meets a grayscale optimization condition of a gamma curve is determined.

In step S53, on determining that the to-be-displayed grayscale meets the grayscale optimization condition of the gamma curve, the refresh period is divided into multiple sub-frames with a same duration; where, in each sub-frame, the duration of the light-emitting phase of the sub-pixel is not exactly the same.

In step S54, in the refresh period of the to-be-displayed image, the sub-pixel is controlled to display first grayscales based on first data signals; where the first grayscale corresponding to at least a first part of the sub-frames is greater than the to-be-displayed grayscale, the first grayscale corresponding to at least a second part of the sub-frames is less than the to-be-displayed grayscale, and the first grayscales are not equal to the to-be-displayed grayscale, the first grayscales and the first data signals corresponding to the first grayscales satisfy the gamma curve.

In the method for driving display shown in FIG. 9, the process of step S51 to step S52 is the same as step S11 to step S12 in the above embodiment, which differs from the above embodiment is that, the method as shown in FIG. 9 includes: the process of dividing the refresh period of the to-be-displayed image into multiple sub-frames, which is shown in step S53.

In the method for driving display shown in FIG. 9, the durations of the multiple sub-frames divided in the refresh period are the same, regardless of whether the refresh period is divided into sub-frames of a fixed first quantity or the refresh period is divided into sub-frames of a preset quantity related to the input information. In this way, the refresh period can be directly divided into multiple sub-frames with the same duration, which is convenient for the refresh period to be divided into multiple sub-frames.

In an embodiment, in the multiple sub-frames divided in the same refresh period, the duration of each sub-frame is the same, and different sub-frames have different durations of light-emitting phases when emitting light, to realize PWM driving. With the durations of different sub-frames are the same and yet the durations of the data writing phases are different, the durations of the light-emitting phases of different sub-frames can be different when emitting light.

Figure 10:
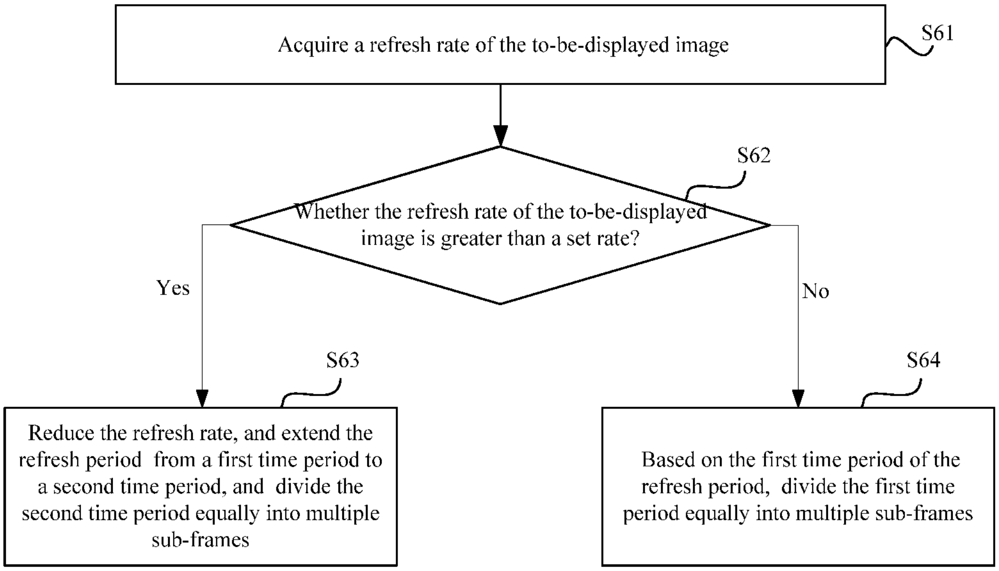
FIG. 10 is a flowchart of a method for dividing multiple sub-frames in a refresh period according to an embodiment of the present disclosure.

The above method of dividing the refresh period into multiple sub-frames with the same duration can be shown in FIG. 10.

Referring to FIG. 10, FIG. 10 is a flowchart of a method for dividing multiple sub-frames in a refresh period according to an embodiment of the present disclosure. The method includes steps S61 to S64 as follows.

In step S61, a refresh rate of the to-be-displayed image is acquired.

In step S62, whether the refresh rate of the to-be-displayed image is greater than a set rate is determined.

In step S63, in a case that the refresh rate is greater than the set rate, the refresh rate is reduced, and the refresh period is extended from a first time period to a second time period, and the second time period is equally divided into multiple sub-frames.

In step S64, in a case that the refresh rate is no greater than the set rate, based on the first time period of the refresh period, the first time period is equally divided into multiple sub-frames.

In an embodiment, in the method shown in FIG. 10, the set rate is no less than 120 Hz.

Based on the above embodiments, a display driver chip is further provided according to another embodiment of the present disclosure, which can implement the above method for driving display.

Figure 11:
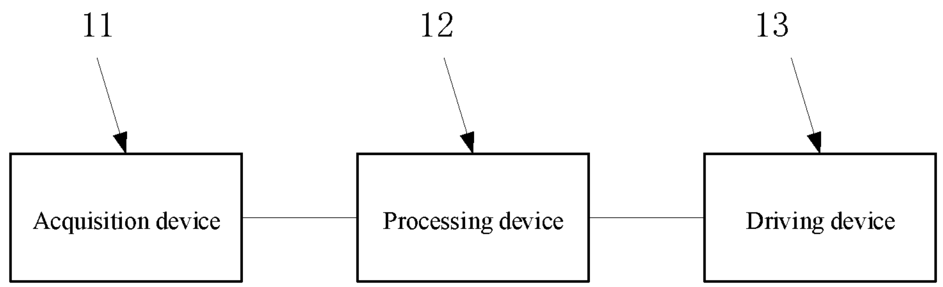
FIG. 11 is a schematic diagram of a display driver chip according to an embodiment of the present disclosure.

Referring to FIG. 11, FIG. 11 is a schematic diagram of a display driver chip according to an embodiment of the present disclosure. The display driver chip as shown in FIG. 11 includes as follows.

An acquisition device 11, configured to acquire a to-be-displayed grayscale of a sub-pixel in a frame of a to-be-displayed image.

A processing device 12, configured to determine whether the to-be-displayed grayscale meets a grayscale optimization condition of a gamma curve; and divide a refresh period of the to-be-displayed image into multiple sub-frames on determining that the to-be-displayed grayscale meets the grayscale optimization condition of the gamma curve.

A driving device 13, configured to control the sub-pixel to display first grayscales based on first data signals, in the refresh period of the to-be-displayed image; where the first grayscale corresponding to at least a first part of the sub-frames is greater than the to-be-displayed grayscale, the first grayscale corresponding to at least a second part of the sub-frames is less than the to-be-displayed grayscale, and the first grayscales are not equal to the to-be-displayed grayscale; the first grayscales and the first data signals corresponding to the first grayscales satisfy the gamma curve.

In a case that the to-be-displayed grayscale meets the grayscale optimization condition of the gamma curve, it indicates that the sub-pixel cannot accurately display the brightness of the to-be-displayed grayscale based on the to-be-displayed data signal. The display driver chip can split the to-be-displayed grayscale that cannot accurately display the brightness into a combination of two or more first grayscales, i.e., it can divide one refresh period into multiple sub-frames and control the sub-pixel to display the first grayscales based on the first data signals in each sub-frame, to equivalently display the to-be-displayed grayscale. In this way, the brightness of the to-be-displayed grayscale can be displayed accurately.

Figure 12:
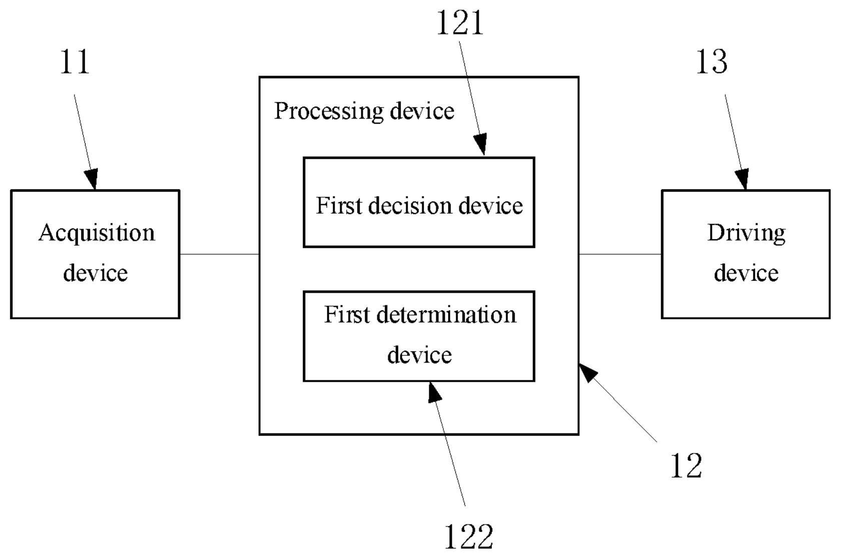
FIG. 12 is a schematic diagram of a display driver chip according to another embodiment of the present disclosure.

Referring to FIG. 12, FIG. 12 is a schematic diagram of a display driver chip according to another embodiment of the present disclosure. Based on the above embodiment, in the display driver chip shown in FIG. 12, the processing device 12 includes: a first decision device 121, configured to determine whether the to-be-displayed grayscale and a to-be-displayed data signal corresponding to the to-be-displayed grayscale meet the gamma curve; a first determination device 122, configured to determine that the grayscale optimization condition is met, in a case that the to-be-displayed grayscale and the to-be-displayed data signal corresponding to the to-be-displayed grayscale do not satisfy the gamma curve; and determine that the grayscale optimization condition is not met, in a case that the to-be-displayed grayscale and the to-be-displayed data signal corresponding to the to-be-displayed grayscale satisfy the gamma curve.

When determining whether the to-be-displayed grayscale and the corresponding to-be-displayed data signal satisfy the gamma curve, the first decision device 121 only needs to determine whether the target coordinates are located on the gamma curve. In other words, whether the relationship corresponding to the gamma curve is satisfied. In a case that the relationship is not satisfied, then it is determined that the grayscale optimization condition is met, the to-be-displayed image is required to display in multiple sub-frames based on the solution of the present disclosure. Otherwise, it is determined that the grayscale optimization condition is not met, the sub-pixel is directly controlled to display the to-be-displayed grayscale based on the to-be-displayed data signal without the need of multiple sub-frames.

Figure 13:
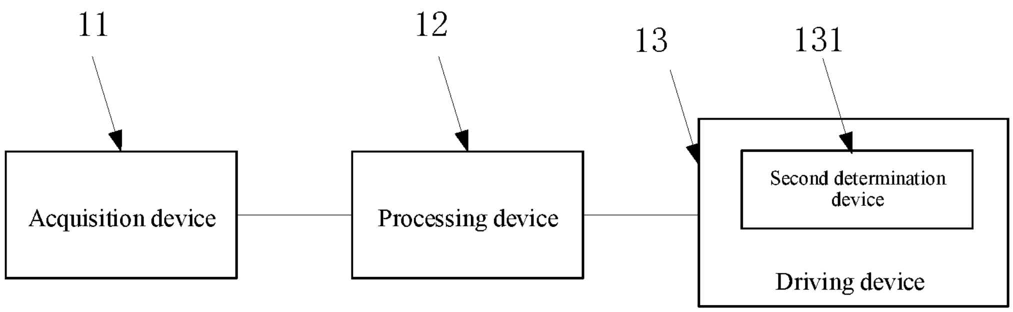
FIG. 13 is a schematic diagram of a display driver chip according to still another embodiment of the present disclosure.

Referring to FIG. 13, FIG. 13 is a schematic diagram of a display driver chip according to still another embodiment of the present disclosure. The driving device 13 includes: a second determination device 131, configured to determine the first grayscales of the sub-pixel in different sub-frames and the corresponding first data signals based on the quantity of sub-frames divided in the refresh period. The first grayscales and the first data signals corresponding to sub-frames are related to the quantity of sub-frames divided in the refresh period. For the divided sub-frames of different quantity, multiple sets of first grayscales and their corresponding first data signals are pre-stored, to read the first grayscales corresponding to sub-frames and the corresponding first data signals when the grayscale optimization conditions are satisfied, and the accurate brightness of the to-be-displayed grayscale is equivalently displayed in multiple sub-frames manner.

Figure 14:
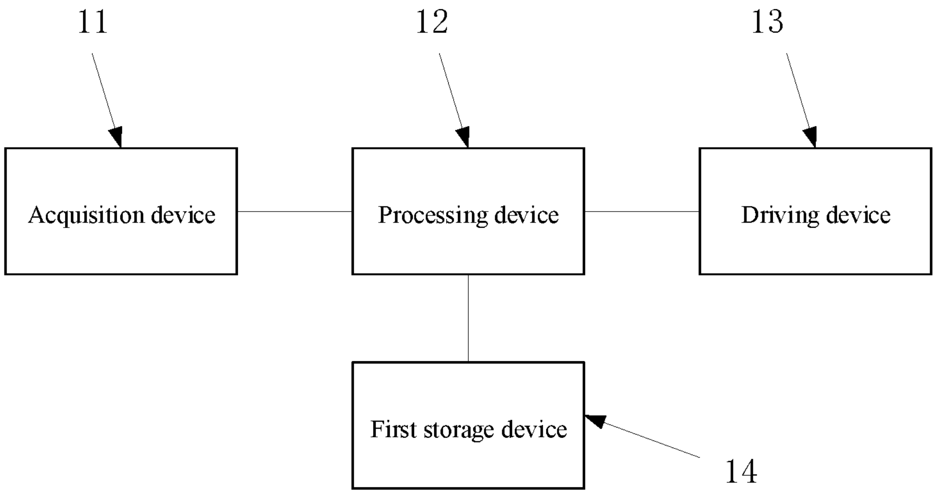
FIG. 14 is a schematic diagram of a display driver chip according to still another embodiment of the present disclosure.

Referring to FIG. 14, FIG. 14 is a schematic diagram of a display driver chip according to still another embodiment of the present disclosure. On the basis of the display driver chip provided in any of the embodiments in FIG. 11 to FIG. 13, the display driver chip shown in FIG. 14 includes: a first storage device 14, configured to pre-store multiple information tables; where, each information table includes multiple first data signals corresponding to different first grayscales in a case that the refresh period is divided into sub-frames of a preset quantity; where, different information tables correspond to different preset quantities. When multiple information tables are pre-stored, the divided sub-frames of different preset quantities correspond to different information tables. After determining the quantity of the divided sub-frames, the first grayscale and the first data signal required for each sub-frame may be obtained by querying the corresponding information table, to equivalently display the accurate brightness of the to-be-displayed grayscale by displaying the corresponding first grayscales through multiple sub-frames respectively.

Figure 15:
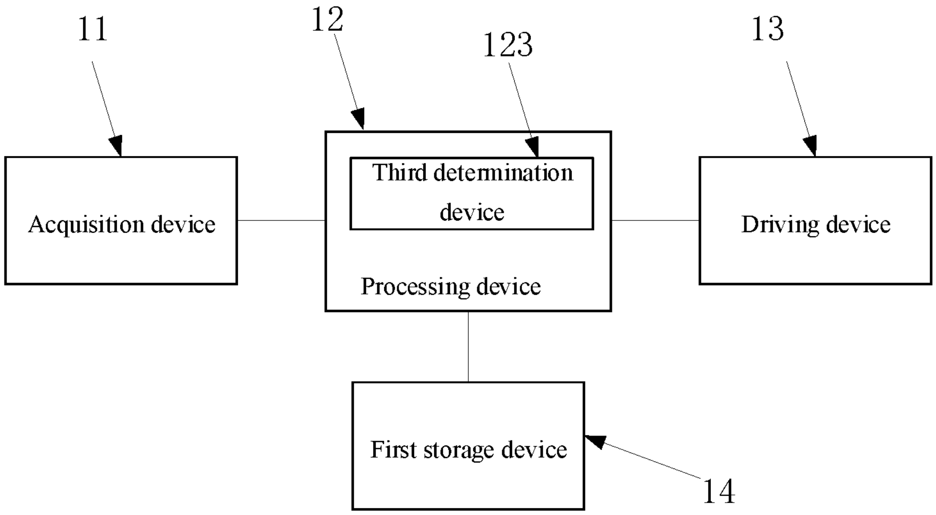
FIG. 15 is a schematic diagram of a display driver chip according to still another embodiment of the present disclosure.

Referring to FIG. 15, FIG. 15 is a schematic diagram of a display driver chip according to still another embodiment of the present disclosure. On the basis of the display driver chip shown in FIG. 14, in the display driver chip shown in FIG. 15, the processing device 12 includes a third determination device 123, configured to determine the quantity of sub-frames divided in the refresh period based on the inputted input information indicating the quantity of sub-frames. When multiple information tables are pre-stored, the divided sub-frames of different preset quantities correspond to different information tables. After determining the quantity of the divided sub-frames, the first grayscale and the first data signal required for each sub-frame may be obtained by querying the corresponding information table, to equivalently display the accurate brightness of the to-be-displayed grayscale by displaying the corresponding first grayscales through multiple sub-frames respectively.

Figure 16:
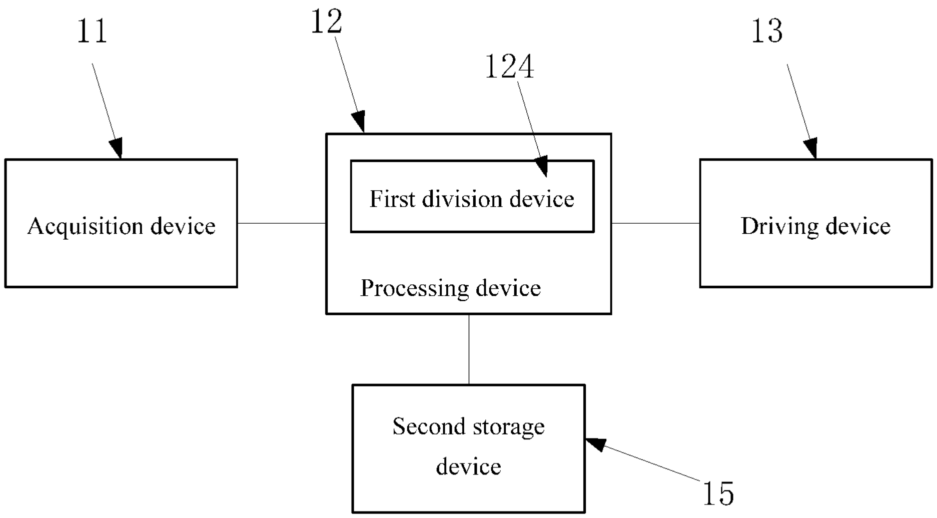
FIG. 16 is a schematic diagram of a display driver chip according to still another embodiment of the present disclosure.

Referring to FIG. 16, FIG. 16 is a schematic diagram of a display driver chip according to still another embodiment of the present disclosure. On the basis of the display driver chip provided by any of the embodiments in FIG. 11 to FIG. 13, the display driver chip shown in FIG. 16 further includes: a second storage device. The second storage device is configured to pre-store an information table, and the information table corresponds to multiple first data signals corresponding to the first grayscales in a case that the refresh period is divided into sub-frames of a first quantity; and the processing device includes: a first division device 124, configured to divide the refresh period into sub-frames of the first quantity. In this way, the refresh period can be directly and automatically divided into sub-frames of the fixed first quantity, and then the first grayscales required by each sub-frame for display and the corresponding first data signals can be selected directly in the information table.

In the display driver chip provided in the embodiment of the present disclosure, the processing device 12 is configured to divide the refresh period into multiple sub-frames with the same duration. In each of the multiple sub-frames, the duration of the light-emitting phase of the sub-pixel is not exactly the same, and the PWM driving mode of grayscale display based on the duration of the light-emitting phase can be realized. The durations of the multiple sub-frames divided in the refresh period are the same, regardless of whether the refresh period is divided into sub-frames of a fixed first quantity or the refresh period is divided into sub-frames of a preset quantity related to the input information. In this way, the refresh period can be directly divided into multiple sub-frames with the same duration, which is convenient for the refresh period to be divided into multiple sub-frames.

Figure 17:
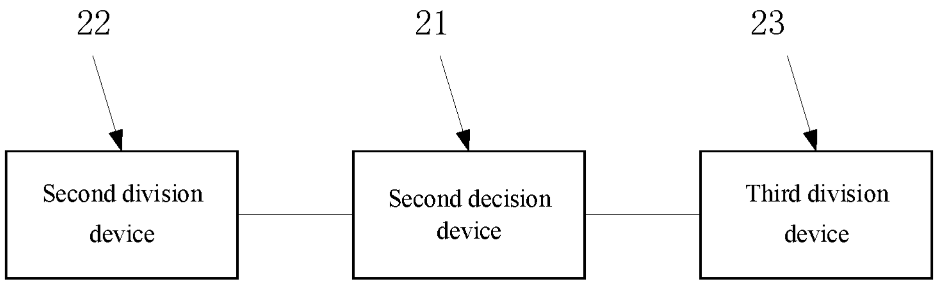
FIG. 17 is a schematic diagram of a processing device according to an embodiment of the present disclosure.

Referring to FIG. 17, FIG. 17 is a schematic diagram of a processing device according to an embodiment of the present disclosure. In this manner, the processing device 12 includes as follows.

A second decision device 21, configured to determine whether a refresh rate of the to-be-displayed image is greater than a set rate.

A second division device 22, configured to reduce the refresh rate and extend the refresh period from a first time period to a second time period, and divide the second time period equally into multiple sub-frames, in a case that the refresh rate is greater than the set rate.

A third division device 23, configured to divide the first time period of the refresh period equally into multiple sub-frames based on the first time period, in a case that the refresh rate is no greater than the set rate. In one embodiment, the set rate is no less than 120 Hz.

In a case that the refresh rate of the to-be-displayed image is greater than the set rate, the duration of the refresh period of the image is relatively short. In this case, when the refresh period of the image is divided into multiple sub-frames for display, some sub-frames have insufficient charging time, resulting in failing to display the corresponding first grayscales accurately. In the embodiment of the present disclosure, the above problem can be solved by extend the refresh period from the first time period to the second time period, and dividing the second time period equally into multiple sub-frames.

In a case that the refresh rate of the to-be-displayed image is no greater than the set rate, when the refresh period of the image is divided into multiple sub-frames for display, the charging time of multiple sub-frames divided based on the duration of the first time period can meet the requirements. In this way, the first grayscales can be accurately displayed in the light-emitting phase.

Figure 18:
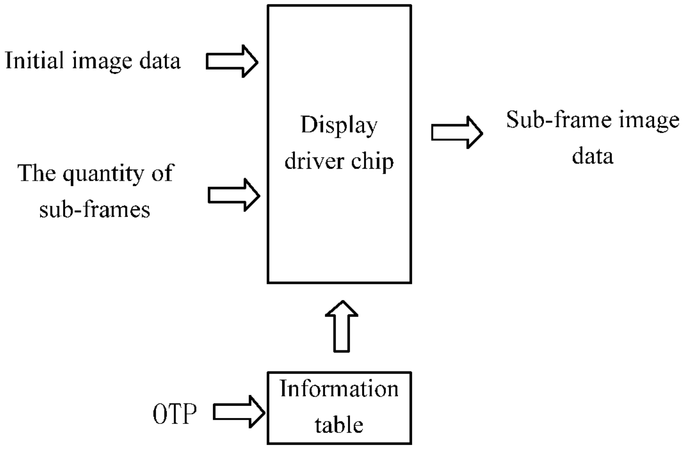
FIG. 18 is a schematic diagram of a principle of display driving control of a display panel by a display driver chip according to an embodiment of the present disclosure.

Referring to FIG. 18, FIG. 18 is a schematic diagram of a principle of display driving control of a display panel by a display driver chip according to an embodiment of the present disclosure. When the grayscale optimization condition of the gamma curve is met, the display driver chip can read sub-frame image data in the information table based on the quantity of sub-frames divided in the refresh period and an initial image data; and then based on the first data signals in the sub-frame image data, it can control the sub-pixel to display the corresponding first grayscales in each sub-frame sequentially. Where, the initial image data includes the to-be-displayed grayscale of the sub-pixel in the to-be-displayed image and the to-be-displayed data signal. The information table may be programmed into the display driver chip based on the one time programmable (OTP).

After the initial image data is inputted, according to the information table, the first data signals in different first grayscales for each sub-pixel in the image corresponding to the initial data are determined and cached. According to the quantity of sub-frames and the refresh rate, a timing sequence conforming to the output rate of the sub-frame is formed, and the cached data is invoked to output the sub-frame image data according to the determined timing sequence.

As shown in FIG. 18, in the embodiments of the present disclosure, while driving the display panel for image display, the initial image data can be split into multiple pieces of sub-image data, which are displayed sequentially in the form of sub-frames. The immediacy and accuracy of input and output operations can be ensured by algorithms, to ensure the synchronization of data streams.

In the embodiments of the present disclosure, it can display the to-be-displayed grayscales that cannot accurately display the brightness in a manner of multiple sub-frame combination by multiple first grayscales that can accurately display the brightness. In addition, it can accurately present the brightness of all grayscales according to the brightness relationship of the gamma curve, which especially ensure the accurate distinguishing display of low grayscale brightness.

A refresh period is divided into multiple sub-frames, and the corresponding first grayscales are sequentially displayed in each sub-frame based on the first data signals. Where, in the two adjacent sub-frames in any timing sequence, the first grayscale displayed in one sub-frame is greater than the to-be-displayed grayscale, and the first grayscale displayed in another sub-frame is less than the to-be-displayed grayscale. In this way, when the first grayscales of each sub-frame are sequentially displayed, the first grayscales on adjacent sides of the to-be-displayed grayscale can be switched fast, and the luminous flux per unit time can accurately present the brightness of the to-be-displayed grayscale.

In the multiple sub-frames divided by the same refresh period of the image, the first grayscales are not exactly the same, where the first grayscales displayed in the multiple sub-frames can present periodic changes. It may be set that the first grayscales displayed in the odd sub-frames in timing sequence are the same, while the first grayscales displayed in the even sub-frames are the same, and the first grayscales displayed in the odd sub-frames are different from the first grayscales displayed in the even sub-frames. In one embodiment, the first grayscales displayed in the multiple sub-frames may not change periodically. In this case, the first grayscales displayed in the odd sub-frames may be not exactly the same, and the first grayscales displayed in the even sub-frames may be not exactly the same.

For example, it is assuming that a refresh period is set to be divided into 2N sub-frames, the 2N sub-frames are sequentially set as the 1-st sub-frame to the 2N-th sub-frame based on the display timing, where N is a positive integer; a grayscale of 15 is the to-be-displayed grayscale that cannot accurately display the brightness, a grayscale of 14 and a grayscale of 16 are two first grayscales that can accurately display the brightness. It may be set that the first grayscales displayed in the odd sub-frames are all grayscales of 14, and the first grayscales displayed in the even sub-frames are all grayscales of 15.

In the embodiment of the present disclosure, among the first grayscales displayed in any two adjacent sub-frames, the first grayscale displayed in one sub-frame is greater than the to-be-displayed grayscale, while the first grayscale displayed in another sub-frame is less than the to-be-displayed grayscale. In this way, in the process of displaying the sub-frames sequentially, the first grayscales greater than the to-be-displayed grayscale and the first grayscales less than the to-be-displayed grayscale can be fast and alternately displayed, which makes the luminous flux per unit time present the brightness of the to-be-displayed grayscale accurately.

TABLE 1

| To-be-displayed grayscale | First grayscale displayed in a first sub-frame F1 | First grayscale displayed in a second sub-frame F2 |
|---|---|---|
| 16 | 15 | 17 |
| 14 | 13 | 15 |
| 12 | 11 | 13 |

In Table 1, it shows that, in a case that a refresh period is divided into the first sub-frame F1 and the second sub-frame F2 in sequence, for three to-be-displayed different grayscales, which are equivalently displayed based on the first grayscales displayed in the first sub-frame F1 and the second sub-frame F2, the first grayscale displayed in the first sub-frame F1 and the second sub-frame F2 corresponding to each to-be-displayed grayscale.

As shown in Table 1, the refresh period of a frame of the to-be-displayed image is equally divided into two sub-frames, and according to a scanning time, the two sub-frames are the first sub-frame F1 and the second sub-frame F2 in sequence. The first grayscale displayed in the first sub-frame F1 is less than the to-be-displayed grayscale, and the first grayscale displayed in the second sub-frame F2 is greater than the to-be-displayed grayscale.

Figure 19:
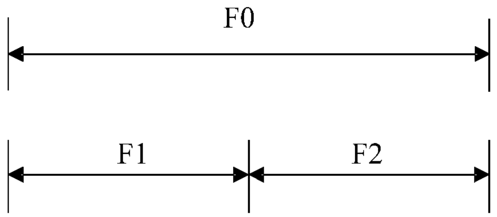
FIG. 19 is timing diagrams of an image frame according to an embodiment of the present disclosure.

Referring to FIG. 19, FIG. 19 is timing diagrams of an image frame according to an embodiment of the present disclosure. Where, the upper diagram in FIG. 19 is the timing sequence of the frame of the initial image when the to-be-displayed grayscale is displayed based on the to-be-displayed data. In this embodiment, one frame F0 of the initial image is equally divided into a first sub-frame F1 and a second sub-frame F2.

TABLE 2

| To-be-dis-played grayscale | First grayscale displayed in a first sub-frame F1 | First grayscale displayed in a second sub-frame F2 | First grayscale displayed in a third sub-frame F3 | First grayscale displayed in a fourth sub-frame F4 |
|---|---|---|---|---|
| 16 | 15 | 17 | 15 | 17 |
| 14 | 13 | 15 | 13 | 15 |
| 12 | 11 | 13 | 11 | 13 |
| 10 | 0 | 20 | 0 | 20 |
| 9 | 0 | 18 | 0 | 18 |
| 7 | 0 | 13 | 0 | 13 |
| 6 | 0 | 11 | 0 | 13 |
| 5 | 0 | 0 | 0 | 20 |
| 4 | 0 | 8 | 0 | 8 |
| 3 | 0 | 0 | 0 | 11 |
| 2 | 0 | 0 | 0 | 8 |
| 1 | | — | | |

In Table 2, it shows that, when one refresh period is equally divided into the first sub-frame F1 to the fourth sub-frame F4 in sequence, for twelve different to-be-displayed grayscales, which are equivalently displayed based on the first grayscales displayed in the first sub-frame F1 to the fourth sub-frame F4, the first grayscales displayed in the first sub-frame F1 to the fourth sub-frame F4 corresponding to each to-be-displayed grayscale. When the to-be-displayed grayscale is 1, if the minimum of the first grayscale is 8, it is necessary to set the quantity of sub-frames divided in one refresh period to be at least eight, and the equivalent display effect of all sub-frames is the grayscale of 1.

As shown in Table 2, the refresh period of a frame of the to-be-displayed image is equally divided into four sub-frames, and the four sub-frames are sequentially the first sub-frame F1 to the fourth sub-frame F4 according to the scanning time. The first grayscale displayed in the first sub-frame F1 is less than the to-be-displayed grayscale, and the first grayscale displayed in the second sub-frame F2 is greater than the to-be-displayed grayscale.

Figure 20:
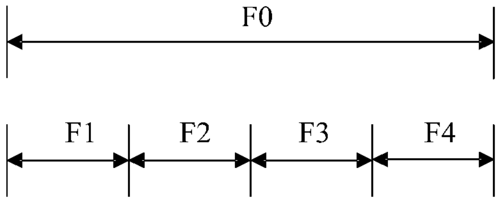
FIG. 20 is timing diagrams of an image frame according to another embodiment of the present disclosure.

Referring to FIG. 20, FIG. 20 is timing diagrams of an image frame according to another embodiment of the present disclosure. The upper diagram in FIG. 20 is the timing sequence of the frame of the initial image when the to-be-displayed grayscale is displayed based on the to-be-displayed data. In this embodiment, one frame F0 of the initial image is equally divided into a first sub-frame F1 to a fourth sub-frame F4.

When multiple sub-frames are used to equivalently display a frame of to-be-displayed image, the difference between the average value of the first grayscales displayed in all sub-frames and the to-be-displayed grayscale is set to be not exceed one. In other words, in a frame of the to-be-displayed image, the quantity of sub-frames divided in the refresh period is set to be n, n is a positive integer and greater than 1; where, a sum of the first grayscales displayed in n sub-frames is A, the to-be-displayed grayscale is G0, and the difference between A/n and G0 is not greater than 1, and the sub-pixel can accurately display the brightness of the to-be-displayed grayscale and distinguish the brightness of adjacent grayscales.

In the embodiment of the present disclosure, n may be selected according to different effects, and the value of n is not specifically limited. As described above, multiple information tables respectively corresponding to different n can be pre-stored. When n is different, the output timing sequence of each sub-frame needs to be adapted to the value of n.

Figure 21:
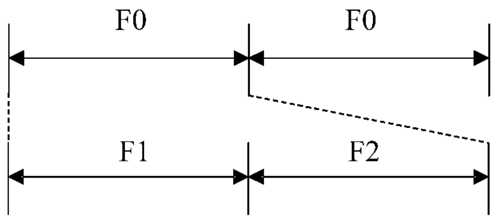
FIG. 21 is timing diagrams of an image frame according to still another embodiment of the present disclosure.

Referring to FIG. 21, FIG. 21 is timing diagrams of an image frame according to still another embodiment of the present disclosure. In this mode, it is different from the mode shown in FIG. 19 in that each frame F0 of the initial image extends the refresh period from the first time period to the second time period. Subsequently, the second time period is equally divided into the first sub-frame F1 and the second sub-frame F2.

Figure 22:
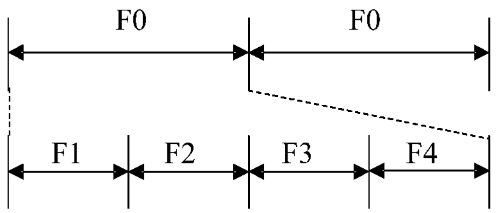
FIG. 22 is timing diagrams of an image frame according to still another embodiment of the present disclosure.

Referring to FIG. 22, FIG. 22 is timing diagrams of an image frame according to still another embodiment of the present disclosure. In this mode, it is different from that shown in FIG. 20 in that each frame F0 of the initial image extends the refresh period from the first time period to the second time period. Subsequently, the second time period is equally divided into the first sub-frame F1 to the fourth sub-frame F4.

When the initial image is a static input image, the content in the initial image data of each frame of the initial image is the same. In this case, it may be preferable to extend the refresh period from the first time period to the second time period, and then divide the second time period into multiple sub-frames.

The display driver chip provided by the implementation of the present disclosure can implement the above method for driving display, i.e., it can control the display panel to display based on the PWM driving mode, disassemble the initial image data into multiple sub-frame image data according to the pre-stored information table, and display each sub-frame image sequentially in the form of sub-frames according to a predetermined timing sequence through data transfer processing. The quantity of sub-frames may be set to be two or more. The sub-frames of different quantities correspond to different information tables, and display control is performed sequentially according to the adapted timing sequence. The display timing sequence of each sub-frame can be a dynamic picture that is synchronized with the input timing sequence, or a static image with a delay or timing sequence matching relationship.

Figure 23:
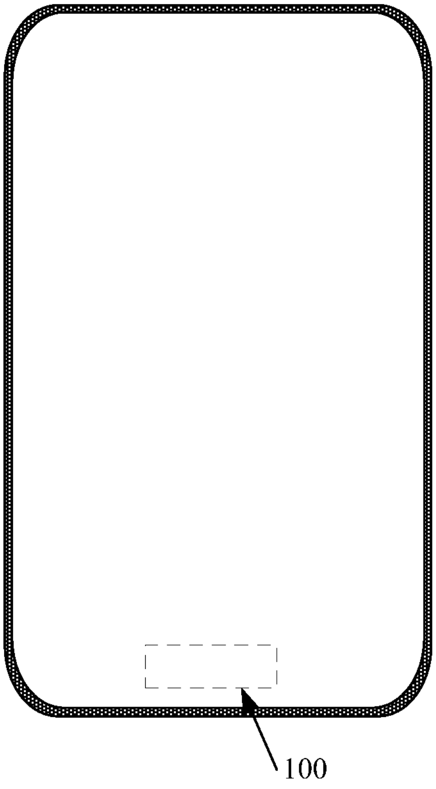
FIG. 23 is a schematic structural diagram of a display device according to an embodiment of the present disclosure.

Based on the above embodiments, a display device is further provided according to another embodiment of the present disclosure, as shown in FIG. 23, FIG. 23 is a schematic structural diagram of a display device according to an embodiment of the present disclosure. The display device includes a display driver chip 100, the display driver chip 100 may be the display driver chip described in any one of the foregoing embodiments.

The display device may be an electronic device such as a mobile phone, a tablet computer, and a wearable device, and the like. The display device can display the to-be-displayed grayscales that cannot be accurately displayed in a multiple sub-frames display manner, to improve the display quality.

Each embodiment in this specification is described in a progressive, parallel, or progressive and parallel manner. Each embodiment focuses on the differences from other embodiments. The same and similar parts between the various embodiments can be referred to each other.

It should be noted that in the description of the present disclosure, the descriptions of the figures and embodiments are illustrative rather than restrictive. Similar reference numerals identify similar structures throughout the embodiments of the specification. In addition, the drawings may exaggerate the thickness of some layers, films, panels, regions and the like for the sake of understanding and ease of description. In addition, it should be understood that when an element such as a layer, film, region, or substrate is referred to as being "on" another element, it can be directly on the other element or intervening elements may be existed. In addition, "on" means positioning an element on or under another element, which does not essentially mean positioning on an upper side of another element according to the direction of gravity.

The orientation or positional relationship indicated by the terms "upper", "lower", "top", "bottom", "inner", "outer", and the like are based on the orientation or positional relationship shown in the drawings, which are only for the convenience of describing the present disclosure and simplified descriptions, rather than indicating or implying that the apparatus or element referred to must have a specific orientation, be constructed and operate in a specific orientation, which should not be construed as limiting the present disclosure. When a component is considered to be "connected" to another component, it may be directly connected to another component or there may also be an intervening component.

It should be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, an article or a device including a series of elements include not only the disclosed elements but also other elements that are not clearly enumerated, or further include inherent elements of the article or the device. Unless expressively limited, the statement "including a . . . " does not exclude the case that other similar elements may exist in the article or the device other than enumerated elements.

What is claimed is:

1. A method for driving display of a display panel, comprising:

acquiring a to-be-displayed grayscale of a sub-pixel in a frame of a to-be-displayed image;

determining whether the to-be-displayed grayscale meets a grayscale optimization condition of a gamma curve, comprising:

when the to-be-displayed grayscale and a to-be-displayed data signal corresponding to the to-be-displayed grayscale do not satisfy the gamma curve, determining that the grayscale optimization condition is met; and when the to-be-displayed grayscale and the to-be-displayed data signal corresponding to the to-be-displayed grayscale satisfy the gamma curve, determining that the grayscale optimization condition is not met;

on determining that the to-be-displayed grayscale meets the grayscale optimization condition of the gamma curve, dividing a refresh period of the to-be-displayed image into a plurality of sub-frames; and in the refresh period of the to-be-displayed image, controlling the sub-pixel to display first grayscales based on first data signals; wherein the first grayscale corresponding to at least a first part of the sub-frames is greater than the to-be-displayed grayscale, the first grayscale corresponding to at least a second part of the sub-frames is less than the to-be-displayed grayscale, and the first grayscales are not equal to the to-be-displayed grayscale, the first grayscales and the first data signals corresponding to the first grayscales satisfy the gamma curve.

2. The method according to claim 1, wherein the controlling the sub-pixel to display first grayscales based on first data signals in the refresh period of the to-be-displayed image comprises:

determining the first grayscales of the sub-pixel in different sub-frames and the first data signals corresponding to the first grayscales, based on a quantity of sub-frames divided in the refresh period.

3. The method according to claim 2, further comprising:

pre-storing a plurality of information tables, wherein each information table comprises a plurality of first data signals corresponding to different first grayscales, in a case that the refresh period is divided into sub-frames of a preset quantity;

wherein different information tables correspond to different preset quantities.

4. The method according to claim 3, wherein the dividing the refresh period of the to-be-displayed image into the plurality of sub-frames comprises:

determining the quantity of sub-frames divided in the refresh period, based on inputted input information indicating the quantity of sub-frames.

5. The method according to claim 2, wherein an information table is pre-stored, and the information table corresponds to a plurality of first data signals corresponding to the first grayscales in a case that the refresh period is divided into sub-frames of a first quantity;

the dividing the refresh period of the to-be-displayed image into the plurality of sub-frames comprises:

dividing the refresh period into sub-frames of the first quantity.

6. The method according to claim 1, wherein the dividing the refresh period of the to-be-displayed image into the plurality of sub-frames comprises:

dividing the refresh period into the plurality of sub-frames with a same duration; wherein a duration of a light-emitting phase of the sub-pixel in each of the plurality of sub-frames is not exactly the same.

7. The method according to claim 6, wherein the dividing the refresh period into the plurality of sub-frames with a same duration comprises:

determining whether a refresh rate of the to-be-displayed image is greater than a set rate;

in a case that the refresh rate is greater than the set rate, reducing the refresh rate, and extending the refresh period from a first time period to a second time period, and dividing the second time period into the plurality of sub-frames equally; and in a case that the refresh rate is no greater than the set rate, dividing the first time period of the refresh period into the plurality of sub-frames equally based on the first time period of the refresh period.

8. The method according to claim 7, wherein the set rate is no less than 120 Hz.

9. A display driver chip, comprising a processor, configured to:

acquire a to-be-displayed grayscale of a sub-pixel in a frame of a to-be-displayed image;

determine whether the to-be-displayed grayscale meets a grayscale optimization condition of a gamma curve, wherein the processor is further configured to determine whether the to-be-displayed grayscale and a to-be-displayed data signal corresponding to the to-be-displayed grayscale meet the gamma curve; and determine that the grayscale optimization condition is met when the to-be-displayed grayscale and the to-be-displayed data signal corresponding to the to-be-displayed grayscale do not satisfy the gamma curve; and determine that the grayscale optimization condition is not met when the to-be-displayed grayscale and the to-be-displayed data signal corresponding to the to-be-displayed grayscale satisfy the gamma curve; and on determining that the to-be-displayed grayscale meets the grayscale optimization condition of the gamma curve, divide a refresh period of the to-be-displayed image into a plurality of sub-frames; and control the sub-pixel to display first grayscales based on first data signals, in the refresh period of the to-be-displayed image; wherein the first grayscale corresponding to at least a first part of the sub-frames is greater than the to-be-displayed grayscale, the first grayscale corresponding to at least a second part of the sub-frames is less than the to-be-displayed grayscale, and the first grayscales are not equal to the to-be-displayed grayscale; wherein the first grayscales and the first data signals corresponding to the first grayscales satisfy the gamma curve.

10. The display driver chip according to claim 9, wherein the processor is further configured to determine the first grayscales of the sub-pixel in different sub-frames and the first data signals corresponding to the first grayscales, based on a quantity of sub-frames divided in the refresh period.

11. The display driver chip according to claim 10, wherein the display driver chip further comprises:

a first storage, configured to pre-store a plurality of information tables, wherein each information table comprises a plurality of first data signals corresponding to different first grayscales in a case that the refresh period is divided into sub-frames of a preset quantity, wherein different information tables correspond to sub-frames of different preset quantities.

12. The display driver chip according to claim 11, wherein the processor is further configured to determine the quantity of sub-frames divided in the refresh period, based on inputted input information indicating the quantity of sub-frames.

13. The display driver chip according to claim 10, wherein the display driver chip further comprises: a second storage, configured to pre-store an information table, and the information table corresponds to a plurality of first data signals corresponding to the first grayscales in a case that the refresh period is divided into sub-frames of a first quantity; and the processor is further configured to divide the refresh period into sub-frames of the first quantity.

14. The display driver chip according to claim 9, wherein the processor is further configured to divide the refresh period into the plurality of sub-frames with a same duration; wherein a duration of a light-emitting phase of the sub-pixel in each of the plurality of sub-frames is not exactly the same.

15. The display driver chip according to claim 14, wherein the processor is further configured to determine whether a refresh rate of the to-be-displayed image is greater than a set rate; reduce the refresh rate and extend the refresh period from a first time period to a second time period, and divide the second time period into the plurality of sub-frames equally, in a case that the refresh rate is greater than the set rate; and divide the first time period of the refresh period into the plurality of sub-frames equally based on the first time period, in a case that the refresh rate is no greater than the set rate.

16. A display device, comprising a display driver chip, wherein the display driver chip comprises a processor, configured to:

acquire a to-be-displayed grayscale of a sub-pixel in a frame of a to-be-displayed image;

determine whether the to-be-displayed grayscale meets a grayscale optimization condition of a gamma curve, wherein the processor is further configured to determine whether the to-be-displayed grayscale and a to-be-displayed data signal corresponding to the to-be-displayed grayscale meet the gamma curve; and determine that the grayscale optimization condition is met when the to-be-displayed grayscale and the to-be-displayed data signal corresponding to the to-be-displayed grayscale do not satisfy the gamma curve; and determine that the grayscale optimization condition is not met when the to-be-displayed grayscale and the to-be-displayed data signal corresponding to the to-be-displayed grayscale satisfy the gamma curve; and on determining that the to-be-displayed grayscale meets the grayscale optimization condition of the gamma curve, divide a refresh period of the to-be-displayed image into a plurality of sub-frames; and control the sub-pixel to display first grayscales based on first data signals, in the refresh period of the to-be-displayed image; wherein the first grayscale corresponding to at least a first part of the sub-frames is greater than the to-be-displayed grayscale, the first grayscale corresponding to at least a second part of the sub-frames is less than the to-be-displayed grayscale, and the first grayscales are not equal to the to-be-displayed grayscale; wherein the first grayscales and the first data signals corresponding to the first grayscales satisfy the gamma curve.

* * * * *